United States Patent [19]

Wojtowicz et al.

[11] 3,879,475

[45] Apr. 22, 1975

[54] METHOD FOR THE PREPARATION OF BIODEGRADABLE GLYCIDOL SURFACTANTS

[75] Inventors: John A. Wojtowicz, Cheshire, Conn.; Milton Lapkin, Barrington, R.I.

[73] Assignee: Olin Corporation, New Haven, Conn.

[22] Filed: Jan. 10, 1973

[21] Appl. No.: 322,340

Related U.S. Application Data

[63] Continuation-in-part of Ser. No. 27,107, April 9, 1970, Pat. No. 3,719,636.

[52] U.S. Cl. ............. 260/615 B; 252/307; 252/351
[51] Int. Cl. ............................................. C07c 43/04
[58] Field of Search ................................ 260/615 B

[56] References Cited
UNITED STATES PATENTS

| 2,089,569 | 8/1937 | Orthner et al. II | 260/615 R |
| 2,131,142 | 9/1938 | Orthner et al. I | 260/615 BX |
| 2,236,919 | 4/1941 | Reynhart | 260/615 B |
| 2,380,185 | 7/1965 | Marple et al. | 260/615 B |
| 2,723,294 | 11/1955 | Benoit | 260/615 B |
| 2,782,240 | 2/1957 | Hefner et al. | 260/615 B |
| 2,807,651 | 9/1957 | Britton et al. | 260/615 B |
| 3,042,666 | 7/1962 | Genthes | 260/615 B |
| 3,317,508 | 5/1967 | Winquist et al. | 260/615 R |
| 3,445,525 | 5/1968 | Bormann et al. | 260/615 B |

*Primary Examiner*—Howard T. Mars
*Attorney, Agent, or Firm*—Robert L. Andersen; Eugene Zagarella, Jr.

[57] ABSTRACT

This invention relates to a novel method of preparing biodegradable glycidol surfactants by reacting selected aliphatic alcohols with glycidol in the presence of a polar, non-reactive, miscible solvent and to the surfactants produced by such method.

7 Claims, No Drawings

METHOD FOR THE PREPARATION OF BIODEGRADABLE GLYCIDOL SURFACTANTS

This is a continuation-in-part of co-pending application Ser. No. 27,107, filed Apr. 9, 1970, now U.S. Pat. No. 3,719,636.

This invention relates to a novel method for preparing biodegradable glycidol surfactants by reacting selected aliphatic alcohols with glycidol in the presence of a polar, non-reactive, miscible solvent and to the surfactants produced by such method.

Previous methods of preparing surfactants derived from alkylphenols and glycidol have been described in U.S. Pat. Nos. 2,213,477 and 2,233,381. While, the surfactants produced by these methods are generally considered satisfactory, they are not biodegradable and are also not considered economically attractive. Although surfactants derived from glycidol and aliphatic alcohols have not been disclosed, U.S. Pat. No. 2,131,142 shows the oxyalkylation of aliphatic alcohols with glycidol followed by reaction with ethylene oxide. However, it was found that by using conditions similar to said U.S. Pat. No. 2,131,142, i.e. reacting aliphatic alcohol with glycidol, extremely low amounts of the alcohol are converted, resulting in poor yields, and even more significantly, the resulting products are too highly hydrophilic and exhibit properties which are not satisfactory (See Examples V to VII).

Now it has been found that by reacting selected aliphatic alcohols with glycidol in the presence of selected polar, non-reactive and miscible (with the alcohol, glycidol and reaction product) solvents, alcohol consumption is increased significantly, resulting in the formation of compounds having the general formula:

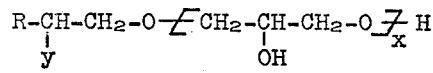

wherein R is a linear aliphatic hydrocarbon of 6 to 24 carbons, y is hydrogen or a hydroxyl group, and x is 4 to 14.

The compounds formed by the method of this invention generally are used as biodegradable surfactants and more particularly, are useful, for example, as wetting agents, dispersing agents and foaming agents.

More particularly, this invention relates to the reaction of selected aliphatic alcohols with glycidol in the presence of a polar, non-reactive, miscible solvent and a basic or acid catalyst as illustrated by the following equation wherein for instance, cetyl alcohol is reacted with 6 moles of glycidol in the presence of methyl ethyl ketone (MEK) and potassium hydroxide:

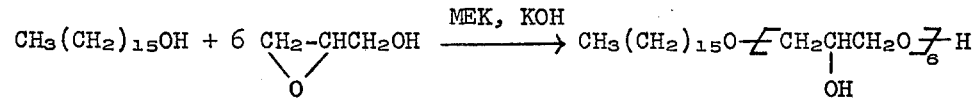

The aliphatic alcohols which are suitable for use in the method of this invention are shown by the following formula:

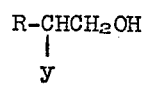

wherein R is a linear aliphatic, saturated or unsaturated, hydrocarbon group containing 6 to 24 and preferably 10 to 18 carbon atoms and y is a hydrogen or hydroxyl group. Illustrative of the compounds defined by the above formula are the following alcohols: octyl, decyl, dodecyl (lauryl), tetradecyl (myristyl), hexadecyl (cetyl), octadecyl (stearyl), eicosyl, undecylenic, oleyl, linolyl and glycols such as 1,2-dodecanediol, 1,2-hexadecanediol and 1,2-octadecandiol. Additionally, mixtures of the above alcohols may be used including for example, well-known commercial mixtures such as Alfol 1214 (55% of $C_{12}$, 43% of $C_{14}$), Alfol 1216 (61% of $C_{12}$, 26% of $C_{14}$, 11% of $C_{16}$), Alfol 1218 (40% of $C_{12}$, 30% of $C_{14}$, 20% of $C_{16}$, 10% of $C_{18}$), all produced by Continental Oil Co. and Neodol 25 (23% of $C_{12}$, 25% of $C_{13}$, 31% of $C_{14}$ and 21% of $C_{15}$) produced by the Shell Chemical Co.

The solvents which may be used in the method of this invention generally include any solvent which is polar, non-reactive and miscible with the selected alcohol, glycidol and the reaction product. It is also preferable that the selected solvent be volatile at reaction temperature. While any solvent having the above-indicated properties may be used, the preferred solvents are the ketones (with basic catalyst) and ethers (with acid or basic catalyst), and more particularly, dialkyl ketones having 4 to 8 carbon atoms and the mono and polyethers having 3 to 12 carbon atoms. Illustrative of such compounds are the following: methyl ethyl ketone, methyl propyl ketone, methyl isobutyl ketone, diethyl ketone, dipropyl ketone, dibutyl ketone, dioxane, ethylene glycol dimethyl ether, diethylene glycol dimethyl ether (diglyme), triethylene glycol dimethyl ether (triglyme), dipropyl ether and dibutyl ether. Other compounds suitable for use as solvents in this invention include the amides (with basic catalyst), the dioxolanes (with basic catalyst) and the formals (with basic catalyst) and more particularly the amides of the formula:

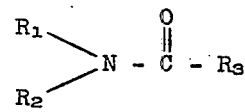

where $R_1$, $R_2$ and $R_3$ represent independently selected alkyl groups having a combined total of 2 to 12 carbon atoms or are hydrogen atoms; dioxolanes of the formula:

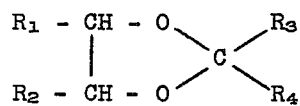

where the R groups are independently selected alkyl groups having a combined total of 3 to 8 carbon atoms or are hydrogen atoms and the formals of the formula:

$$R_1 - OCH_2O - R_2$$

where the R groups are independently selected alkyl groups having a combined total of 2 to 8 carbon atoms. Illustrative of these compounds are the following: dimethyl formamide, dimethyl acetamide, 2-methyl, 1,3-dioxolane, 2-ethyl, 1,3-dioxolane, formal (dimethoxymethane), diethyl formal and dipropyl formal. While the above compounds are illustrative of the solvents which may be used in this invention, it is emphasized that any compound having all the desired characteristics, indicated above, may suitably be used.

As noted above the mono- and polyethers having 3 to 12 carbon atoms may be used with acid (as well as basic) catalyst. The useful ethers include the dialkyl ethers and the dialkyl ethers of alkylene glycols and cyclic ethers such as dioxane (e.g. 1,4- and 1,3-dioxane) and pyran (e.g. α; γ; 2,3- and 3,4-dihydropyran and tetrahydropyran). Other useful cyclic ethers include dibenzo-18-crown-6 and dicyclohexayl-18-crown-6.

The basic catalyst which may be used includes the alkali metal hydroxides, e.g. sodium hydroxide, potassium hydroxide and lithium hydroxide; the alkali metals, e.g. sodium and potassium and the alkali metal alkoxides such as sodium methoxide and potassium ethoxide. The particularly preferred basic catalyst is potassium hydroxide.

The acid catalyst which may be used can be any of the Lewis type acids which are known to be active in Friedel-Crafts type reactions. Suitable catalysts of this nature are listed, for example, by G. Olah in "Friedel-Crafts and Related Reactions" published by Interscience Publications, 1963–64. Included are $BF_3$ and its etherates such as $BF_3 \cdot Et_2O$, $SnCl_4$, $TiCl_4$, $SbCl_5$, HF, $AlCl_3$, $Al(C_2H_5)_3$, $AlBr_3$, $FeCl_3$, $ZnCl_2$ and $ZnBr_2$ with the preferred catalyst embodiment being the $BF_3 \cdot Et_2O$ (called boron trifluoride etherate or boron trifluoride diethyl ether). The Lewis acids may also be advantageously used in combination with co-catalysts, for example, $H_2O$, HCl, HCOOH and $CH_3COOH$.

Generally the molar ratio of glycidol to selected alcohol will vary widely. More particularly a ratio of 4:1 to 14:1 moles of glycidol per mole of alcohol and preferably 6:1 to 12:1 is used. Generally, the use of a lower mole ratio will result in products having very low water solubility and the use of a higher mole ratio will result in products being too highly hydrophilic and not having the desired surface and wetting properties.

The concentration of glycidol in the selected solvent may be from 1 to 95% by weight and preferably from 5 to 15% by weight.

The amount of catalyst used will generally vary from 1 to 15% by weight based on the amount of selected alcohol charged and preferably will vary from 3 to 12%.

The temperature at which the reaction is carried out will vary widely but more particularly will depend on the type catalyst being used. When using a basic catalyst, the temperature will generally vary 125° to 175°C. and preferably from 140° to 160°C. When using an acid catalyst, the temperature will generally vary from 25° to 125°C. and preferably from 40° to 75°C.

The compounds and method of this invention are further illustrated by the following examples.

EXAMPLE I

Alfol 1214 (4.90 g., 25 mmoles) and powdered KOH (0.54 g.) were charged into a 50 cc. three-neck flask fitted with stirrer, additional funnel, 6 inch Vigreaux column and distillation head. The well-stirred reaction mixture was heated with an oil bath to 150° to 155°C. under a slow $N_2$ purge. Methyl ethyl ketone (MEK) solution (180 g.) containing pure glycidol (19.24 g., 99.2% assay; 260 mmoles) was added dropwise over 2.5 hours. MEK was distilled out continuously during the reaction. The distillate contained 10 mmoles of glycidol. The product was stripped of volatiles using an $N_2$ purge. The stripped product containing 4% unreacted Alfol 1214 (determined by chromatographic analysis). The utilization of Alfol 1214 was 81% resulting in a 12.3 to 1 mole adduct of glycidol to alcohol. The product was extracted with 150 cc. of boiling hexane to remove unreacted alcohol. The stripped hexane extract amounted to 1.1 g. The hexane purified product was freed of solvent under vacuum.

A 1% solution of the surfactant had the following cloud points:

| Solvent | Cloud Point, °C. |
|---|---|
| water | >100 |
| 25% NaCl | >100 |
| 30% NaOH | >100 |

The surface properties (at 25°C.) of a 0.1% aqueous solution of the product were as follows:

| | |
|---|---|
| Surface Tension, dynes/cm. | 29.3 |
| Interfacial Tension, dynes/cm. | 5.2 |

EXAMPLE II

Alfol 1214 (4.91 g., 25mM) and KOH (0.52 g.) were reacted at 150°C. as described in Example I with crude glycidol in MEK solution (238 g., 261 mM epoxide). Addition time was 3 hours. The distillate contained 10 mM epoxide. After addition of crude glycidol solution and complete reaction of glycidol (followed by epoxide analysis), the volatiles were stripped out with a stream of $N_2$. The product contained 2.4% unreacted Alfol 1214 (determined chromatographically). Thus 88% of the Alfol 1214 was utilized resulting in an 11.4 to 1 mole adduct of glycidol to alcohol. The product was refluxed with 150 cc. hexane for 1 hour using vigorous stirring. After cooling, the hexane layer was decanted and vacuum stripped; wt. 1.4 g. The product was freed of hexane under vacuum. The solvent-free purified product exhibited the following cloud points as a 1% solution:

| Solvent | Cloud Point, °C. |
|---|---|
| water | >100 |
| 25% NaCl | >100 |
| 30% NaOH | >100 |

The surface properties (at 25°C.) of a 0.1% aqueous solution of the product surfactant were as follows:

| | |
|---|---|
| Surface Tension, dynes/cm. | 30.7 |
| Interfacial Tension, dynes/cm. | 4.7 |

EXAMPLE III

Alfol 1214 (4.90 g., 25mM), purified 1,4-dioxane (50 cc.) and $BF_3 \cdot Et_2O$ (0.25 cc.) were heated to 45°C. in a 200 cc. three-neck flask fitted with stirrer, thermometer and addition funnel. Glycidol (18.5 g., 250 mM) dissolved in 50 cc. dioxane was added dropwise over a 1½ hour period maintaining the temperature at 45° to 55°C. No epoxide remained unreacted at the end of the addition. The reaction mixture was neutralized with aqueous NaOH and vacuum stripped; wt. residue 23 g. The residue was extracted with hexane as described in Examples I and II. The stripped extract weighed 2.8 g. and contained 22% Alfol 1214. Thus 87% of the Alfol 1214 had reacted with glycidol to form a surfactant having a 11.5 to 1 mole adduct of glycidol to alcohol. The product was freed of solvent under vacuum. A 1% aqueous solution of the product had a cloud point >100°C. The product was soluble in 25% NaCl and 30% NaOH. The surface properties (at 25°C.) of a 0.1% aqueous solution of the surfactant were as follows:

| | |
|---|---|
| Surface Tension, dynes/cm. | 27.6 |
| Interfacial Tension, dynes/cm. | 2.4 |
| Draves Wetting Time, secs. | 77 |

EXAMPLE IV

A sample of $C_{15-18}$ diol [$CH_3(CH_2)_{12-15}CHOHCH_2OH$] was prepared as follows. Dry acetone (125 cc.) and $BF_3 \cdot Et_2O$ (0.25 cc.) were placed in a 500 cc. three-neck flask fitted with stirrer, addition funnel, 12-inch Vigreaux and distillation head. Nedox 1518 (49 g., 0.20 mole) dissolved in 50 cc. acetone was added dropwise over a period of 1½ hours at a reaction temperature of 45° to 50°. VPC analysis showed complete disappearance of the four epoxides ($C_{15}$ to $C_{18}$), and the appearance of four new higher boiling peaks. Added water (54 g., 3 moles) and heated to reflux. Added 10 drops of concentrated $H_2SO_4$ and began to distill out acetone. Ethanol (125 cc.) was added slowly in order to maintain an homogeneous solution. A total of 250 cc. of distillate was removed (head temperature 80°C.). Flashed-off residual ethanol and water at 100°C. using water aspirator; wt. residue 53 g. The crude product was probably sufficiently pure for use in further reactions. Dissolved the crude product in 300 cc. hot methanol, neutralized with 50% NaOH, filtered and chilled to −25°C. Filtered and vacuum dried solids; wt. 22 g., OH No. 414 (calculated) 416. Concentrated the filtrate to 150 cc., chilled, filtered and vacuum dried solids; wt. 20 g. Filtrate was stripped of MeOH and solids vacuum dried. The recrystallized $C_{15-18}$ diol (10.52 g., 40mM) and KOH (0.35 g.) were reacted at 150°C. with redistilled glycidol (14.8 g., 200 mM, 99.2% assay) dissolved in 135 cc. MEK using the same apparatus described in Example I. Addition time was 1½ hours at a reaction temperature of 150° ± 5°C. No epoxide remained at the end of the addition. Chromatographic analyses showed 100% of the alcohol had reacted to form a 5 to 1 mole adduct of glycidol to alcohol. The residual MEK was stripped-off under vacuum. A 1% solution of the surfactant was soluble in water, 25% NaCl and 30% NaOH with cloud points >100°C. in these solution. A 0.1% aqueous solution of the product had the following surface properties (at 25°C.):

| | |
|---|---|
| Surface Tension, dynes/cm. | 26.5 |
| Interfacial Tension, dynes/cm. | 3.1 |
| Wetting Time, secs. | 180 |

EXAMPLE V

Alfol 1214 (98 g., 0.5 moles) containing KOH (1.7 g.) was heated to 135°C. Glycidol (74 g., 1.0 moles) was added dropwise over 3 hours to a well-stirred reaction mixture and such stirring was continued for an additional 30 minutes to insure complete reaction of the glycidol. After cooling, the reaction mixture was extracted, using hexane, to remove the unreacted alcohol. Ninety percent of the alcohol was recovered unreacted. The residual product as a 0.1% aqueous solution exhibited an interfacial tension of 8.2 dynes/cm at 25°C.

EXAMPLES VI and VII

Using similar conditions as shown in Example V, 49 g. (0.25 moles) of Alfol 1218 was reacted with 119.9 g. (162 moles) and 185 g. (2.5 moles) of glycidol respectively. The amount of unreacted alcohol was 71% in the first preparation and 46% in the second. The two products exhibited interfacial tensions of 7.1 and 7.8 dynes/cm at 25°C.

EXAMPLE VIII

Alfol 1218 (2.20 g., 10.1 mmoles), 1,4-dioxane (15 cc.) and boron trifluoride etherate-$BF_3 \cdot Et_2O$ (0.10 cc.) was heated at 50° to 55°C. in a 200 cc three-neck flask fitted with stirrer, thermometer and additional funnel. Glycidol (7.4 g., 100 mmoles) dissolved in 15 cc of 1,4-dioxane was added dropwise. The small amount of unreacted alcohol was removed by extraction with petroleum ether. The surface properties (at 25°C.) of a 0.1% by weight aqueous solution of the surfactant were as follows:

| | |
|---|---|
| Surface Tension, dynes/cm | 26.8 |
| Interfacial Tension, dynes/cm | 4.8 |

EXAMPLE IX

Alfol 1214 (1.96 g., 10 mmoles), moles), ethylene glycol dimethyl ether (15 cc) and boron trifluoride etherate (0.10 cc.) was heated at 50° to 55°C. with stirring. Glycidol (7.4 g., 100 mmoles) dissolved in ethylene glycol dimethyl ether (18 cc) was added dropwise. Gas chromatographic analysis indicated that 85% of the Alfol 1214 had reacted giving a surfactant having an 11.8 to 1 mole adduct of glycidol to alcohol. The unreacted alcohol was removed by extraction with petroleum ether. A 0.1% aqueous solution of the product surfactant had the following surface properties (at 25°C.):

| | |
|---|---|
| Surface Tension, dynes/cm | 26.7 |
| Interfacial Tension, dynes/cm | 2.5 |

EXAMPLE X

The same procedure as in Example IX was followed using Alfol 1218 (2.16 g, 10 mmoles) instead of Alfol 1214. Chromatographic analysis revealed that 80% of the alcohol had reacted yielding a product having a 12.5 to 1 mole adduct of glycidol to alcohol. The unreacted alcohol was removed by extraction with petroleum ether. A 0.1% aqueous solution of the product surfactant had the following surface properties at 25°C.:

| | |
|---|---|
| Surface Tension, dynes/cm | 27.9 |
| Interfacial Tension, dynes/cm | 2.7 |

What is claimed is:

1. The method for preparing surfactants comprising reacting:
a. an aliphatic alcohol having the formula:

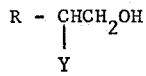

wherein R is a linear aliphatic hydrocarbon containing 6 to 24 carbons and y is a hydrogen or hydroxyl group with
b. glycidol in the presence of a polar, non-reactive and miscible solvent selected from the group consisting of:
i. dialkyl ethers and dialkyl ethers of alkylene glycols having 3 to 12 carbons,
ii. dioxane and
iii. pyran and a Lewis acid catalyst at a temperature of from about 25° to about 125°C, said glycidol and alcohol being present in a ratio of 4:1 to 14:1 moles of glycidol per mole of alcohol.

2. The method of claim 1 wherein said Lewis acid is selected from the group consisting of $BF_3$, BFetherate, $SnCl_4$, $TiCl_4$, $SbCl_5$, HF, $AlCl_3$, $Al(C_2H_5)_3$, $AlBr_3$, $FeCl_3$, $ZnCl_2$ and $ZnBr_2$.

3. The method of claim 2 wherein said Lewis acid is $BF_3$ etherate.

4. The method of claim 3 wherein said reaction is carried out at a temperature of from about 40° to about 75°C.

5. The method of claim 4 wherein R contains 10 to 18 carbons and the molar ratio of glycidol to alcohol is from 6:1 to 12:1.

6. The method of claim 5 wherein said Lewis acid is $BF_3$ etherate.

7. The method of claim 6 wherein said solvent is selected from the group consisting of ethylene glycol dimethyl ether and 1,4-dioxane.

* * * * *